(12) United States Patent
Xue et al.

(10) Patent No.: US 10,955,578 B2
(45) Date of Patent: Mar. 23, 2021

(54) DEVICE AND METHOD FOR GROUND SOURCE TRANSIENT ELECTROMAGNETIC NEAR-FIELD DETECTION AND RELATED DEVICE

(71) Applicant: Institute of Geology and Geophysics, Chinese Academy of Sciences, Beijing (CN)

(72) Inventors: Guoqiang Xue, Beijing (CN); Weiying Chen, Beijing (CN); Shu Yan, Beijing (CN); Nannan Zhou, Beijing (CN); Qingyun Di, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 424 days.

(21) Appl. No.: 16/025,144

(22) Filed: Jul. 2, 2018

(65) Prior Publication Data
US 2020/0003927 A1 Jan. 2, 2020

(51) Int. Cl.
*G01V 3/08* (2006.01)
*G01V 3/26* (2006.01)
*G01V 3/12* (2006.01)

(52) U.S. Cl.
CPC ............ *G01V 3/081* (2013.01); *G01V 3/12* (2013.01); *G01V 3/26* (2013.01)

(58) Field of Classification Search
CPC . G01V 3/10; G01V 3/081; G01V 3/08; G01V 3/12; G01V 3/26; G01V 3/38; H04B 13/02
See application file for complete search history.

(56) References Cited

U.S. PATENT DOCUMENTS

| 6,603,313 B1* | 8/2003 | Srnka | G01V 3/12 324/354 |
| RE40,321 E * | 5/2008 | Srnka | G01V 3/12 324/354 |
| 2006/0203613 A1* | 9/2006 | Thomsen | G01V 3/083 367/38 |
| 2010/0311325 A1* | 12/2010 | Marshall | H04B 13/02 455/40 |
| 2013/0176563 A1* | 7/2013 | Ozawa | G01N 21/658 356/301 |

(Continued)

*Primary Examiner* — Stephanie E Bloss
(74) *Attorney, Agent, or Firm* — Maier & Maier, PLLC

(57) ABSTRACT

The disclosure pertains to the field of electromagnetic exploration, and in particular relates to a device and method for ground source transient electromagnetic near-field detection and related device, with the purpose of solving the problems that the method for loop source transient electromagnetic detection has a relatively small detection depth and weak signals. The device of the disclosure includes an excitation source emitting device and a receiving device for signal detection. The excitation source emitting device includes an emission source, the emission source is a grounded conductor wire; the grounded conductor wire is used to convert a bipolar pulsed current into an electromagnetic field to be emitted underground; and the receiving device is configured for detecting a magnetic field and/or electric field signal in a survey line segment of an observation range of the grounded conductor wire using the method of areal sideline scanning survey.

8 Claims, 10 Drawing Sheets

(56) References Cited

U.S. PATENT DOCUMENTS

| | | | |
|---|---|---|---|
| 2016/0003034 A1* | 1/2016 | Liu | H04L 27/02 340/853.2 |
| 2016/0195631 A1* | 7/2016 | Morrison | G01V 3/12 324/339 |
| 2019/0154439 A1* | 5/2019 | Binder | G01S 15/08 |
| 2020/0003928 A1* | 1/2020 | Xue | G01V 3/34 |

* cited by examiner

DEVICE AND METHOD FOR GROUND SOURCE TRANSIENT ELECTROMAGNETIC NEAR-FIELD DETECTION AND RELATED DEVICE

FIELD

The disclosure pertains to the field of exploration based on electromagnetic method, and in particular relates to a device and method for ground source transient electromagnetic near-field detection and related device.

BACKGROUND

The transient electromagnetic field (TEM) is a time-domain artificial source electromagnetic detection method which is established based on the principle of electromagnetic induction. The operation principle of TEM is shown in FIG. 1A. It is a geophysical exploration method, in which a step wave electromagnetic pulse is used for excitation (see FIG. 1B), and an ungrounded loop is used to emit a primary field underground; after the primary field is shut down, a variation of induced secondary field, generated by underground medium, with time is measured so as to find various geological targets.

The transient electromagnetism device in the form of ground surface central loop was widely used previously. Since the device is very simple and is easy to interpret, it has received widespread applications. The formerly used electrical exploration instruments such as V-5, V8, GDP-32, ROTEM, SIROTEM, PEM or the like are mostly implemented with the ground surface central loop device.

However, since the fields have a cancelling-out effect on each other due to the symmetry of rectangular loop, energy is attenuated quickly in the stratum, the depth of detection is shallow, and it is difficult to lay the loop when the side length is large. In addition, the magnetic loop source only has a horizontal electric field component, making it easy to excite the induction current in the low-resistance layer and presenting a good transverse resolution capability, which is very advantageous for detecting the low-resistance layer. The longitudinal resolution capability is poor. However, in detecting the high-resistance layer, the loop source device on the surface of the earth often fails to achieve good effect. Moreover, due to the structural characteristics of the field itself, the delamination effect of the transient magnetic data of the loop source is not ideal.

The grounded conductor wire source not only has a horizontal component of electric field, but also has a vertical component of electric field. The induced current excited by the horizontal component is advantageous for the detection of low-resistance body. The charges induced by the vertical component in the electrical interface of the stratum facilitate the detection of high-resistance body. All the six components of the electromagnetic field in an orthogonal coordinate system are related to the electrical structure of the stratum, and provides more possibilities for the information exploration and extraction of deep large-scale ore deposits (reserves). In the electrical source transient electromagnetic method, a grounded point electrode is powered with a pulse current to establish a pulsed primary magnetic field underground.

It was discovered that observations can be performed in the near field, which was studied in the former Soviet Union in the 1960s. The so-called near field refers to the case where the offset distance (r) is less than the buried depth (H) of the target layer. The difference of the depth measurement curve in the case of $r/H \leq 0.7$ from that in the case of $r \rightarrow 0$ is less than 5%. Theoretically, it has proven that the near-field method has better reflection of the underground conductor than the far-field method, both the vertical and horizontal resolutions are improved, and the volume effect is greatly reduced. Moreover, the near-field method has a series of advantages over the far-field method in terms of detection depth and work efficiency or the like. However, the application of near-field depth measurement of electrical sources is not widespread.

As can be seen from the above analysis, while the near-field observation is achieved with the loop source, the exploration depth is limited and cannot meet the requirements under the existing conditions. The long-offset and long time window transient electromagnetic depth measurement method (LOWTEM) is mainly used for searching oil deposit, for which the theoretical research is still in the exploratory stage in China and is not suitable for exploration of metallic ores. The electrical source transient electromagnetic theory and method need to be developed, with which the observation can be carried out in near-field zone and middle-field zone. Unlike the far-field method, the late stage data observed in the near-field and middle-field areas have a better delamination capability, thus making it suitable for exploration of metallic ores. One technical problem that needs to be urgently solved by those skilled in the art is how to accurately explore deep geological targets by adopting a novel transient electromagnetic depth measurement method to obtain the accurate and detailed geological information of deep geological targets.

SUMMARY

In order to solve the above-mentioned problem in the prior art, that is, to solve the problems that the method for loop source transient electromagnetic detection has a relatively small detection depth and weak signals, in an aspect of the present disclosure, a device for ground source transient electromagnetic near-field detection is provided, which includes an excitation source emitting device and a receiving device for signal detection, wherein the excitation source emitting device includes an emission source, the emission source is a grounded conductor wire; the grounded conductor wire is used to convert a bipolar pulse current into an electromagnetic field to be emitted underground; and the receiving device is configured for detecting a magnetic field and/or electric field signal in a survey line segment of an observation range of the grounded conductor wire by using the method of areal sideline scanning survey.

Further, the length of the grounded conductor wire satisfies the following conditions:

the actual length L of the grounded conductor wire satisfies a condition of:

$$L \geq L_{line} - 3.5 r_{min}$$

the minimum length $L_{min}$ of the grounded conductor wire satisfies a condition of:

$$L_{min} > 3 L_a$$

wherein $L_{line}$ represents a length of the survey line segment covered by an emission source;

$r_{min}$ represents the minimum offset of the survey line segment; and $L_a$ represents a linear scale of a shallow electrical non-uniform body.

Further, the offset of the survey line segment satisfies the following conditions:

the minimum offset $r_{min}$ satisfies a condition of:

$$r_{min} \geq 3 \times 10^{-3} S_{max} \cdot H_{max}^4 \cdot \frac{\Delta V_{min}}{I \cdot L \cdot q}$$

the maximum offset $r_{max}$ satisfies a condition of:

$$r_{max} \leq 2 S_{max} \cdot \left[ \frac{L \cdot I \cdot q}{\Delta V} \cdot \rho_\tau \right]^{1/4}$$

wherein
$S_{max}$ represents the total longitudinal conductance value within the range of maximum detection depth on the observed profile;
$H_{max}$ represents the maximum detection depth;
$\Delta V_{min}$ represents the minimum effective value of an observed signal;
L represents the actual length of the emission source;
l represents the intensity of emission current;
q represents an effective receiving area for coils or magnetic rod;
$\Delta V$ represents an average value of interference signals in the test zone; and
$\rho_\tau$ represents an average value of apparent resistivity on the observed profile.

Further, the observation range is selected by the following method:
in the case of a vertical magnetic field component, selecting an equatorial zone on both sides of the emission source, whose range of observation is limited to an area forming 150 degrees with both ends of the emission source, as an observation zone; and
in the case of a horizontal electric field component, selecting the axial zone along the direction of the extension line of the emission source as an observation zone.

Further, the bipolar pulse current has a square wave width D of:

$$D = 2.5 T_{max}$$

$$T_{max} \geq 2\mu \cdot H_{max} \cdot S_{max}$$

wherein
$T_{max}$ represents the maximum recording time required;
$S_{max}$ represents the total longitudinal conductance value within the range of maximum detection depth on the observed profile;
$H_{max}$ represents the maximum detection depth; and
$\mu$ represents the magnetic permeability of medium.

Further, the method of areal sideline scanning survey is point-by-point survey or multi-point simultaneous survey.

In another aspect of the present disclosure, a method for ground source transient electromagnetic near-field detection is provided, which includes: performing signal detection using the device for ground source transient electromagnetic near-field detection described above, and calculating an overall apparent resistivity $\rho_s$ using the following method:

$$\rho_s = (\mu_0 r^2 / 4t) \cdot g[h_z(t)]$$

$$g[h_z(t)] = \sum_{i=1}^{5} a_i y^{\beta_i}$$

wherein
$\mu_0$ represents the magnetic permeability of vacuum medium;
r represents the offset between the emission source location and the receiving position;
t represents a sampling delay;
$a_i$, $\beta_i$ are valued according to a preset valuing rule table; and
y represents a uniform half-space magnetic field with a normalized surface at a distance r from the horizontal electric couple emission source.

Further, the preset valuing rule table of $a_i$, $\beta_i$ is:

| | i | 1 | 2 | 3 | 4 | 5 |
|---|---|---|---|---|---|---|
| $y \leq 10^{-5}$ | $\alpha$ | 0.449037 | 0.0 | 0.0 | 0.0 | 0.0 |
| | $\beta$ | −2/3 | — | — | — | — |
| $10^{-5} \langle y \leq 0.05$ | $\alpha$ | 0.447673 | 0.227530 | −2.56717 | 6.66952 | −4.62450 |
| | $\beta$ | −2/3 | −2/5 | −2/7 | −2/9 | −2/11 |
| $0.05 \langle y \leq 0.2$ | $\alpha$ | 0.264751 | 8.17744 | −50.0017 | 89.4178 | −47.7681 |
| | $\beta$ | −2/3 | −2/5 | −2/7 | −2/9 | −2/11 |
| $0.2 \langle y \leq 0.45$ | $\alpha$ | 0.430426 | −0.503995 | 0.469312 | −0.603661 | 0.259355 |
| | $\beta$ | −2/3 | 1/3 | 4/3 | 7/3 | 10/3 |
| $0.45 \langle y \leq 1$ | $\alpha$ | 0.666667 | −0.014646 | −0.273327 | 1.03901 | 0.245262 |
| | $\beta$ | −2/3 | 2 | 3 | 4 | 5 |

In a third aspect of the present disclosure, a storage device is provided, in which a plurality of programs are stored, and the programs are adapted to be loaded and executed by a processor so as to implement the method for ground source transient electromagnetic near-field detection described above.

In a fourth aspect of the present disclosure, a processing device is provided, which includes:
a processor which is adapted to execute programs; and
a storage device which is adapted to store a plurality of programs,
wherein the programs are adapted to be loaded and executed by a processor so as to implement the method for ground source transient electromagnetic near-field detection described above.

The present disclosure has the following advantageous effects: there are a high resolution, a small additional effect, and a large detection depth for the high-resistance target; the field signal with a short offset is strong; a deep part can also be detected; the detection capability for the high-resistance thin layer is relatively strong; the device is convenient to operate with a high work efficiency when operating in the near field, and more accurate profile data can be provided. Especially when exploration is performed in mountain areas, it is more convenient to arrange conductor wires than loops. The requirement on the location of the conductor wires is relatively less strict. The conductor wires may be arranged on sidewalks of the ravines in a test zone or in the place where it is easy to pass through, and the operating efficiency can be greatly improved.

DETAILED DESCRIPTION

Preferred embodiments of the present disclosure will be described below with reference to the accompanying drawings. It should be understood by those skilled in the art that these embodiments are only used to explain the technical principle of the present disclosure, and are not intended to limit the scope of protection of the present disclosure.

In view of the international actual demand for large-depth, high-precision mineral exploration and starting from the essential properties of transient electromagnetic exploration, the present disclosure expands the exploration zone of the electrical source transient electromagnetic method from the far-field zone to the middle and near source zones based on a profound understanding of the theory of time-domain electromagnetic field, thereby achieving the exploration of the entire field. This document discloses a fast and efficient method and technology of transient electromagnetic precision detection for a geological target at a buried depth of 1,500 meters underground, which are easy to implement. The transient electromagnetic detection method is used to detect the near-field source, and the observation data is processed and interpreted according to the entire field theory. The basic requirements for technical work such as technical design, field acquisition, information acceptance, information processing and interpretation, and report preparation for the short-offset transient electromagnetic method are specified. It is mainly applied to the detection of various geological targets within the depth range of 1500 meters.

A device for ground source transient electromagnetic near-field detection is provided according to an embodiment of the disclosure, as shown in FIG. 2, which includes an excitation source emitting device and a receiving device for signal detection, wherein the excitation source emitting device includes an emission source, the emission source is a grounded conductor wire; the grounded conductor wire is used to convert a bipolar pulse current into an electromagnetic field to be emitted underground; and the receiving device is configured for detecting a magnetic field and/or electric field signal in a survey line segment of an observation range of the grounded conductor wire by using the method of areal sideline scanning survey.

In the embodiment of the disclosure, the excitation source emitting device supplies a bipolar pulse current to the grounded conductor wire, an electromagnetic field is emitted into the ground through a grounded electrode AB, the grounded conductor wire generates an excited electromagnetic field, and the underground medium is induced to generate an eddy current. It is advantageous to observe within an offset distance at which the signal is relatively strong. Generally, the signals in the near-field zone and the middle-field zone are relatively strong, and observation points are generally placed in the near-field zone and the middle-field zone during operation.

Figure 1A:
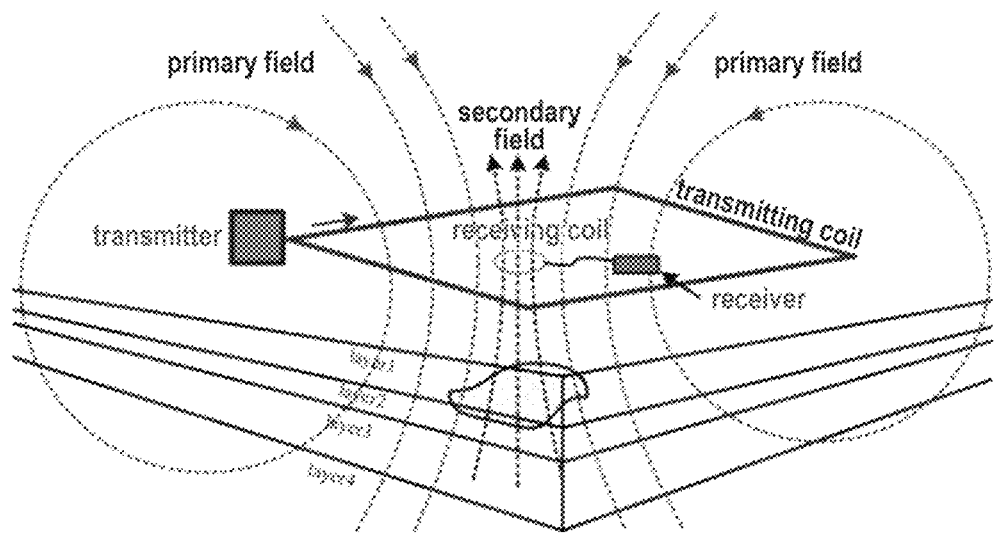
FIG. 1A is a diagram illustrating the operation principle of a transient electromagnetic field method.
Figure 1B:
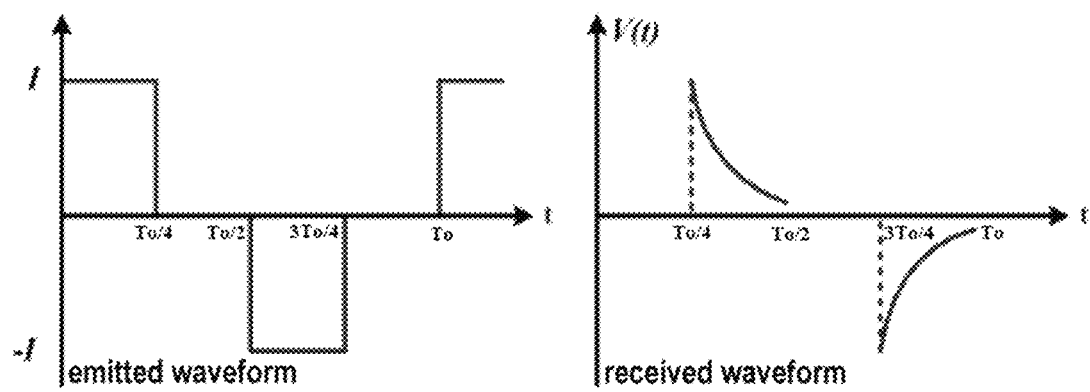
FIG. 1B is a schematic diagram of transmitting and receiving waveforms of the transient electromagnetic field method.
Figure 2A:
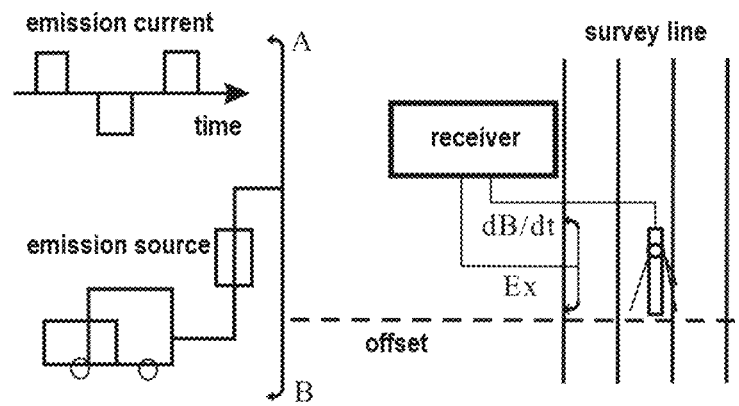
FIG. 2A is a schematic diagram of a device for ground source transient electromagnetic near-field detection according to an embodiment of the present disclosure.

The receiving device in this embodiment may be V8, GDP32, PROTEM, or the like. The magnetic field signal dB/dt may be received by the probe, and the electric field signal Ex may be received by the electrode. The operating method is the same as the general transient electromagnetic method, except that the observation zone is in the near-field zone and the middle-field zone of the electrical source (FIG. 2A).

Figure 2B:
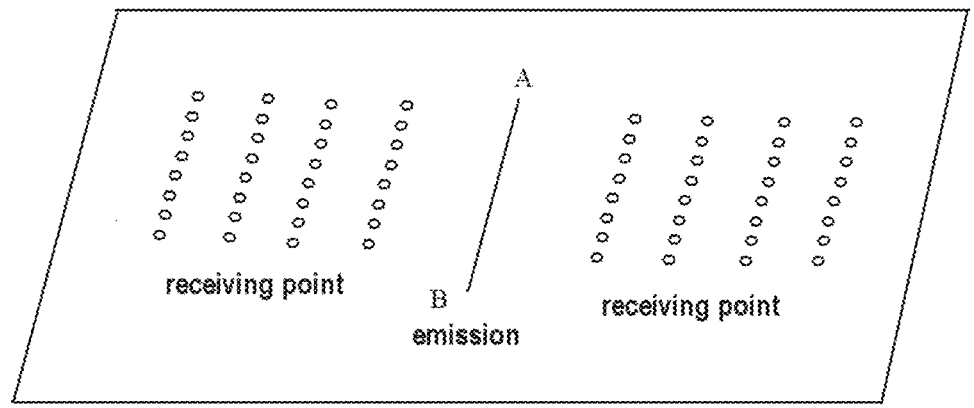
FIG. 2B is a schematic side diagram of a device for ground source transient electromagnetic near-field detection according to an embodiment of the present disclosure.

After the emission wire source AB is arranged, areal sideline scanning survey is performed within a position range on both sides of AB (FIG. 2B). In a case that the areal sideline scanning survey is performed, data at one survey point may be collected at a time, or data at a plurality of survey points may be collected at a time. Preferably, the latter way is adopted, and the efficiency of data collection can be improved.

The important content of the device for ground source transient electromagnetic near-field detection according to this embodiment is described in detail below.

1. Selection of the Length of the Emission Source

Unlike the CSAMT (controlled source acoustic magneto telluric method) and LOTEM (long offset transient electromagnetic method) which are also based on a line source, the emission source needs not to satisfy the dipole condition for the near source transient electromagnetic method. The length of the emission source AB only affects two aspects, one is the size of the observation zone and the length of the survey line, and the other is the size of the transmitted magnetic moment.

In the disclosure, the minimum length $L_{min}$ of the emission source should be greater than 3 times a linear scale $L_a$ of a shallow electrical non-uniform body, that is, $L_{min}>3L_a$.

The actual length L of the emission source is adjusted according to formula (1):

$$L \geq L_{line} - 3.5 r_{min} \tag{1}$$

wherein $L_{line}$ represents the length of the survey line segment covered by an emission source, with a unit of m; and $r_{min}$ represents the minimum offset of the survey line segment, with a unit of m.

2. Observation Range

Components of the electric magnetic field are observed at a small offset distance from the emission source, and a suitable observation range is selected with respect to different components of the electric magnetic field.

Figure 3:
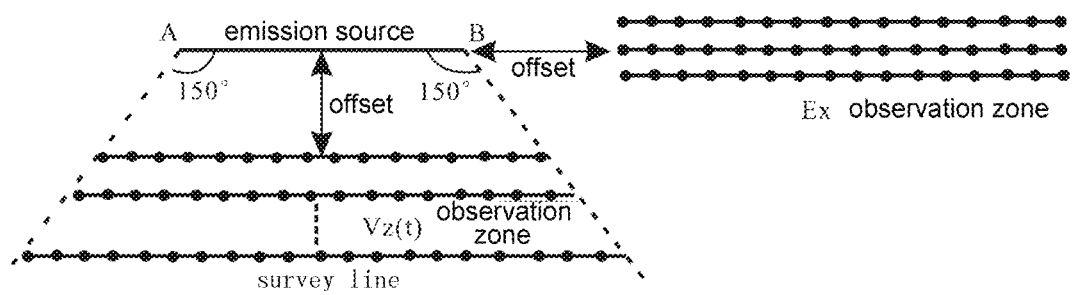
FIG. 3 is a schematic diagram of an observation zone of a device for ground source transient electromagnetic near-field detection according to an embodiment of the present disclosure.

(1) In the case of a vertical magnetic field component Vz(t), an equatorial zone on both sides of the emission source is selected as an observation zone, and the range of the observation zone is limited to a zone forming an angle of 150 degrees with both ends of the emission source (with reference to FIG. 3);

(2) In the case of a horizontal electric field component (Ex), theoretically, observation may be performed within 360 degrees around the emission source, but the observation of Ex is generally performed in the axial zone along the direction of the extension line of the emission source in order to obtain high-sensitivity detection of high-resistance targets.

The way of point-by-point row movement and single point survey may be adopted, or the arrangement mode of multiple-row simultaneous survey and single point movement may be adopted. A single spatial coverage may be realized, or the time-domain multiple coverages may also be realized. Preferably, the latter way is adopted, and the confidence and accuracy of the data can be improved.

3. Offset of the Survey Line Segment (1) The minimum offset $r_{min}$ needs to satisfy the following formula (2):

$$r_{min} \geq 3 \times 10^{-3} S_{max} \cdot H_{max}^4 \cdot \frac{\Delta V_{min}}{I \cdot L \cdot q} \tag{2}$$

wherein $S_{max}$ represents the total longitudinal conductance value within the maximum detection depth on the observed profile, with a unit of S;

$H_{max}$ represents the maximum detection depth, with a unit of m;

$\Delta V_{min}$ represents the minimum effective value of an observed signal, with a unit of mV;

L represents the actual length of the emission source, with a unit of m;

I represents the intensity of emission current, with a unit of A; and q represents an effective receiving area for coils or magnet rod, with a unit of $m^2$.

(2) The maximum offset $r_{max}$ needs to satisfy the following formula (3):

$$r_{max} \leq 2 S_{max} \cdot \left[ \frac{L \cdot I \cdot q}{\Delta V} \cdot \rho_\tau \right]^{1/4} \tag{3}$$

wherein $\Delta V$ represents an average value of interference signals in the test zone, with a unit of mV; and $\rho_t$ represents an average value of apparent resistivity on the observed profile, with a unit of Ω·m.

4. Bipolar Pulse Current Emits Square Wave

The emitted square wave has a width D determined according to formulas (4) and (5):

$$D = 2.5 T_{max} \tag{4}$$

$$T_{max} \geq 2\mu \cdot H_{max} \cdot S_{max} \tag{5}$$

wherein $T_{max}$ represents the maximum recording time required, with a unit of s; and μ represents the magnetic permeability of medium.

A method for ground source transient electromagnetic near-field detection is provided according to an embodiment of the present disclosure, which includes: acquiring a detection signal using the device for ground source transient electromagnetic near-field detection described above, and calculating an overall apparent resistivity $\rho_s$ according to formulas (6) and (7):

$$\rho_s = (\mu_0 r^2 / 4t) \cdot g[h_z(t)] \tag{6}$$

$$g[h_z(t)] = \sum_{i=1}^{5} a_i y^{\beta_i} \tag{7}$$

wherein $\mu_0$ represents the magnetic permeability of vacuum medium;

r represents the offset between the emission source position and the receiving point position;

t represents a sampling delay;

$a_i, \beta_i$ are valued according to a preset valuing rule table; and y represents a uniform half-space magnetic field with a normalized surface at a distance r from the horizontal electric couple emission source.

In order to more clearly illustrate the method for ground source transient electromagnetic near-field detection according to the embodiment, the derivation process of the calculation formula for the overall apparent resistivity $\rho_s$ in this method is described below.

The uniform half-space magnetic field with a normalized surface at a distance r from the horizontal electric couple emission source is expressed as the formulas (8) and (9).

$$h_z(t) = \left(1 - \frac{3}{2}x\right) \mathrm{erf}\left(\frac{1}{\sqrt{x}}\right) + 3\sqrt{\frac{x}{\pi}} e^{-1/x} \tag{8}$$

$$x = \frac{4t}{\mu_0 \sigma_1 r^2} \tag{9}$$

wherein erf (·) represents an error function, and e represents a nature constant.

As can be seen from the formula (8), the analytical expression of σ about $h_z(t)$ cannot be solved, various approximations are not made to the uniform half-space field, but an inverse function of the resistivity to the field value is directly obtained according to the uniform half-space field expression. There is a complex implicit function relationship between the resistivity and the field value in the uniform half-space expression. Therefore, the implicit function must firstly be expanded in series, and the apparent resistivity is obtained by the numerical approximation technique. To this end, the formula (10) is defined as follows.

$$x = g[h_z(t)] \quad (10)$$

Then the formula (9) may be transformed to obtain the formula (6), where $\rho_s = 1/\sigma_1$.

If $\rho_s$ is desired to be obtained, the function $g[h_z(t)]$ must be firstly solved. To this end, the value of y is firstly divided into five intervals (namely y≤$10^{-5}$, $10^{-5}$〈y≤0.05, 0.05〈y≤0.2, 0.2〈y≤0.45, and 0.45〈y≤1) according to y=$h_z(t)$, and then the following series are used to approximate $g[h_z(t)]$ in each of the intervals so as to obtain the formula (7).

It follows that the question now is how to value $a_i$ and $\beta_i$.

In order to value $\beta_i$, series expansion is performed on $h_z(x)$ about x to obtain the formula (11).

$$h_z(x) = \frac{8}{\sqrt{\pi}} x^{-3/2} \sum_{k=0}^{\infty} \frac{(-1)^k}{k!} \frac{1}{(2k+3)(2k+5)} x^{-k} \quad (11)$$

For the above formula, in the case of X→∞, $$h_z(x) \approx \frac{8}{15\sqrt{\pi}} X^{-3/2},$$

and then x=0.449037$y^{2/3}$, that is, if y≤$10^{-5}$, then $\beta_1 = -2/3$ and $a_1 = 0.449037$. With reference to the results, the formula (11) may be expressed as the formula (12).

$$h_z(x) = ax^{-3/2} + a_2 x^{-5/2} + a_3 x^{-7/2} + a_4 x^{-9/2} + a_5 x^{-11/2} \quad (12)$$

The values of $a_1 \sim a_5$ corresponding to each of the intervals are solved using the least square algorithm by selecting a series of typical profiles. The obtained coefficients are shown in table 1.

TABLE 1 polynomial coefficient table

| | i | 1 | 2 | 3 | 4 | 5 |
|---|---|---|---|---|---|---|
| y ≤ $10^{-5}$ | α | 0.449037 | 0.0 | 0.0 | 0.0 | 0.0 |
| | β | −2/3 | — | — | — | — |
| $10^{-5}$〈y ≤ 0.05 | α | 0.447673 | 0.227530 | −2.56717 | 6.66952 | −4.62450 |
| | β | −2/3 | −2/5 | −2/7 | −2/9 | −2/11 |
| 0.05〈y ≤ 0.2 | α | 0.264751 | 8.17744 | −50.0017 | 89.4178 | −47.7681 |
| | β | −2/3 | −2/5 | −2/7 | −2/9 | −2/11 |
| 0.2〈y ≤ 0.45 | α | 0.430426 | −0.503995 | 0.469312 | −0.603661 | 0.259355 |
| | β | −2/3 | 1/3 | 4/3 | 7/3 | 10/3 |
| 0.45〈y ≤ 1 | α | 0.666667 | −0.014646 | −0.273327 | 1.03901 | 0.245262 |
| | β | −2/3 | 2 | 3 | 4 | 5 |

The appropriate coefficients $a_i$ and $\beta_i$ (i=1, 2, . . . 5) are selected in the above table, then are substituted into the formula (7) to calculate the value of $g[h_z(t)]$, and then are substituted into the formula (6) to obtain the value of the apparent resistivity. In order to obtain the apparent resistivity at a moment $t_j$, the appropriate coefficients $a_i$ and $\beta_i$ (i=1, 2, . . . 5) are selected in the above table according to the magnitude of the magnetic field value $h_z(t_j)$=y, then are substituted into the formula (7) to calculate the value of g $[h_z(t)]$, and then are substituted into the formula (6) to obtain the value of the apparent resistivity.

A storage device is provided according to an embodiment of the present disclosure, in which a plurality of programs are stored, and the programs are adapted to be loaded and executed by a processor so as to implement the method for ground source transient electromagnetic near-field detection described above.

A processing device is provided according to an embodiment of the present disclosure, which includes: a processor and a storage device. The processor is adapted to execute a plurality of programs; and the storage device is adapted to store a plurality of programs. The programs are adapted to be loaded and executed by a processor so as to implement the method for ground source transient electromagnetic near-field detection described above.

Those skilled in the art can clearly understand that, for the convenience and conciseness of the description, as to the specific working process and related descriptions of the above-described storage device and processing device, reference may be made to the corresponding processes of the foregoing device and method embodiments, and a repeated description is not given herein.

As compared with the prior art, the disclosure has the following advantages.

(1) A principle of a new exploration method is proposed. Starting from the essential properties of transient electromagnetic exploration, the disclosure expands the exploration zone of the electrical source transient electromagnetic method from the far-field zone to the middle and near source zones based on a profound understanding of the theory of the time-domain electromagnetic field, thereby achieving the exploration of the entire field. The fundamental similarity and difference between the frequency-domain electrical source and the time-domain electrical source are distinguished, which is an innovation on the principle of the exploration method.

(2) A new exploration method is proposed. The conventional loop source transient electromagnetic method is modified into an electrical source transient electromagnetic survey mode. It is convenient to arrange emission conductor wires in the mountain areas, and meanwhile a rapid survey can be achieved. Moreover, the signal-to-noise ratio of the signal is relatively high, and the exploration depth is eventually increased from 500 meters in the past to 1,500 meters.

(3) A new processing method is proposed. Based on the roles of the own field and radiation field in detection and the conditions for separation as well as the method for implementing separation through the waveform selection, the near-field data interpretation method corresponding to the exploration of the entire field zone is provided. The key common technical problem of a low signal-to-noise ratio being caused by a large detection depth in the field of transient electromagnetic exploration is solved, and the methodological theory basis and practical technical means are provided for the extended exploration to the second space.

(4) A small offset survey is used so that the survey can be more concentrated below the emission source. Not only the magnetic field response but also the electric field response is applied in this method. Measuring the electric field response which varies over time is very useful for distinguishing high-resistance targets, since electric charges accumulated along the boundary of the high-resistance targets may be generated when the vertical current interacts with the horizontal stratum, and the electric field is more sensitive to such charge accumulation.

The problem in the prior art that the loop source transient electromagnetic method (LOOP TEM) has a relatively small detection depth is overcome by the present disclosure, and the present disclosure has a good distinguishing ability for the high-resistance targets. Moreover, the shortcoming of weak signals in the long-offset transient electromagnetic method (LOTEM) is overcome. With this method, the underground ore bodies can be quickly detected at a greater depth with a high accuracy. In a one-dimensional situation, by comparing the capability of detecting high-resistance layers of the grounded electric dipole source transient electromagnetic near field and far field method with that of the loop source transient electromagnetic method, it is considered that the grounded electric dipole source transient electromagnetic entire field method is superior to LOOP TEM and LOTEM in detecting the deep high-resistance layers. More accurate information on the location, size, and shape of the underground targets can be obtained, which is important for studying fine geological structures.

In order to illustrate the technical effects of the present disclosure, the effect of the near source transient electromagnetic method is shown by testing practical examples in Ye County, Henan Province.

1. Introduction of Test

Figure 4:
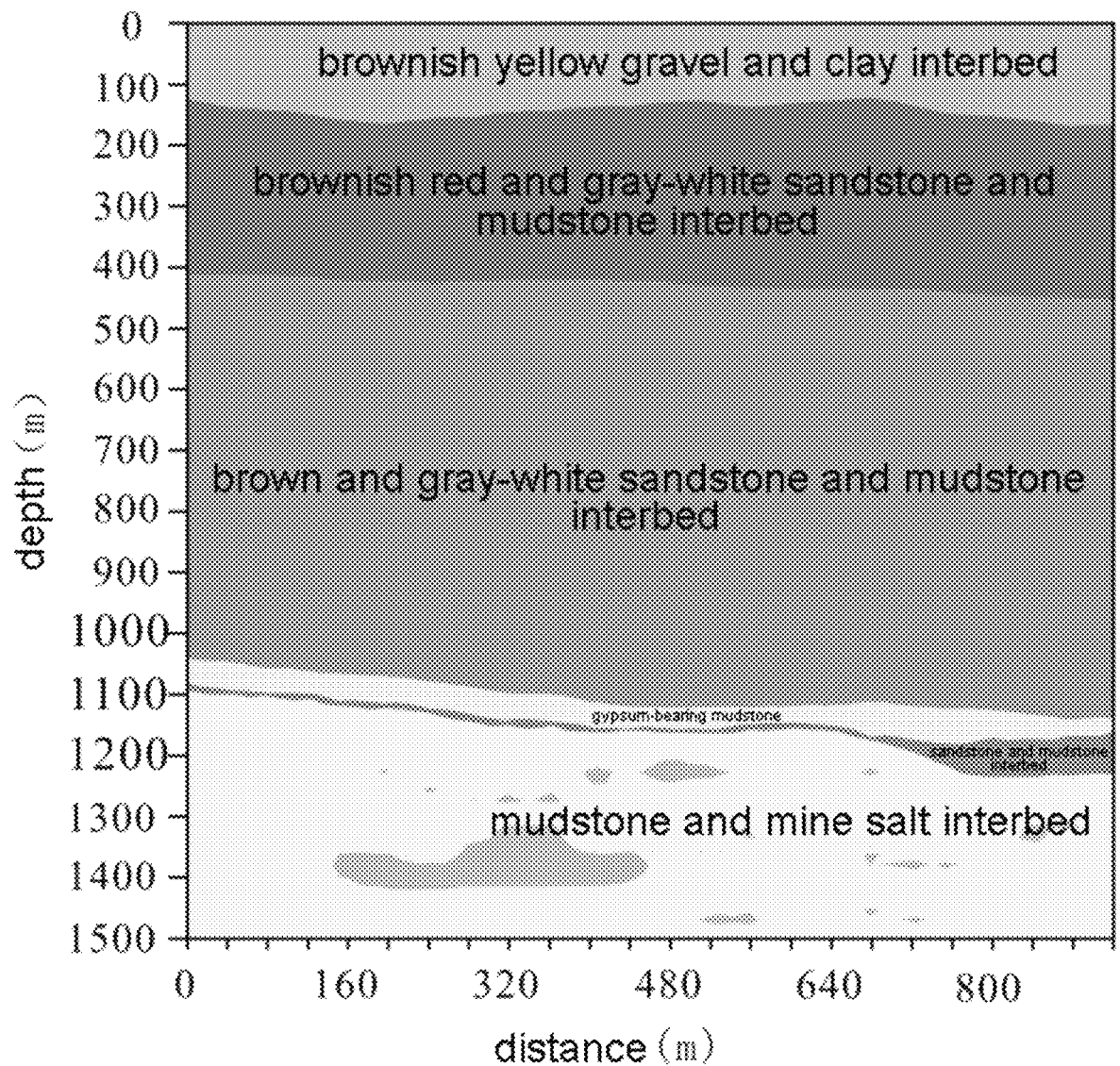
FIG. 4 is a schematic diagram of the stratum of the test zone in Ye County, Henan Province.

In order to verify the theoretical analysis results, to compare the response curves of the near-source transient electromagnetic method under different parameters, and to check the apparent resistivity algorithm and the inversion technique, a zone with flat terrain and a simple stratum structure is selected for actual observation. After investigation, a test site is selected at Ye County in Henan Province. The zone is a salt mine enriched zone with flat surfaces and relatively simple and stable stratum, a hollow space is formed after the deep salt mine is mined, and a brine containing cavern which has a very low resistance is formed by filling water into the hollow space. Another important advantage for selecting this zone is that there are many deep drillings in the test zone and abundant geological data is known. FIG. 4 shows a geological section of the test zone, and the corresponding rock electrical parameters are shown in Table 2.

TABLE 2 electrical parameters of stratum

| Lithology | Range of depth | Range of resistivity ($\Omega \cdot m$) |
|---|---|---|
| sandstone, clay | 1~100 | 100~200 |
| sandstone, mudstone | 100~1050 | 20~80 |
| gypsum-bearing mudstone | 1050~1100 | >500 |
| mudstone, mine salt | >1100 | >500 |
| mine salt cavern | 1100~1500 | <10 |

Figure 5:
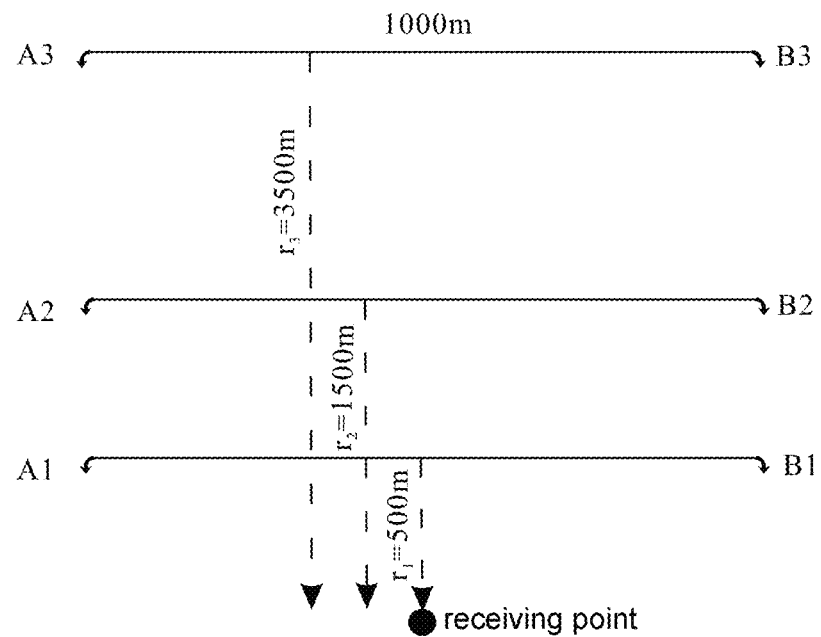
FIG. 5 is a schematic diagram of geometrical arrangement of transmission and reception of the test in Ye County, Henan Province.
Figure 6A:
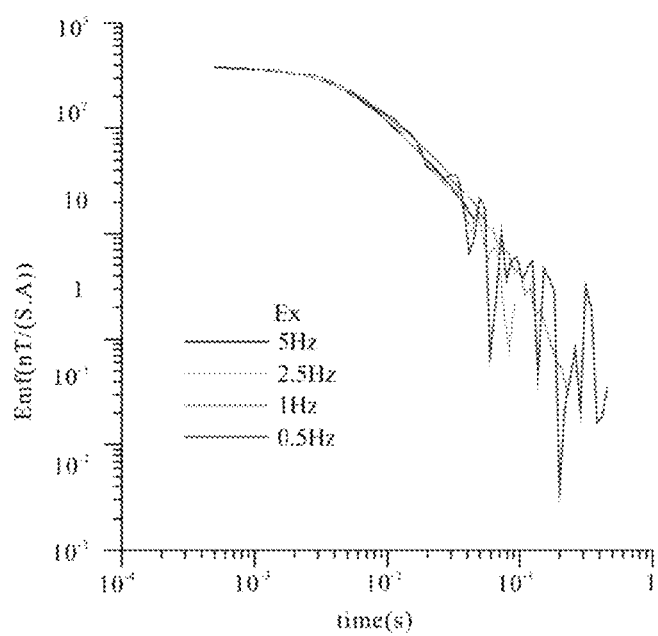
FIG. 6A is schematic diagrams of electromagnetic field response curves in the case of the fixed emitting and receiving distance and different emission fundamental frequencies.
Figure 6B:
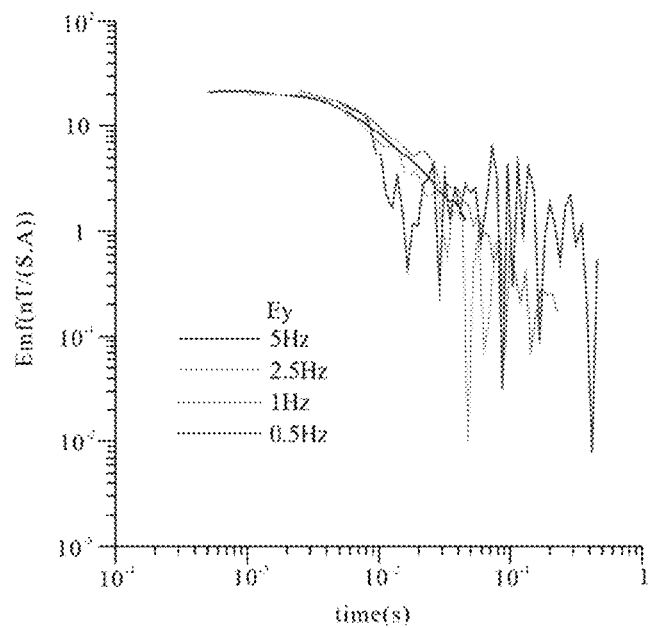
FIG. 6B schematic diagrams of electromagnetic field response curves in the case of the fixed emitting and receiving distance and different emission fundamental frequencies.
Figure 6C:
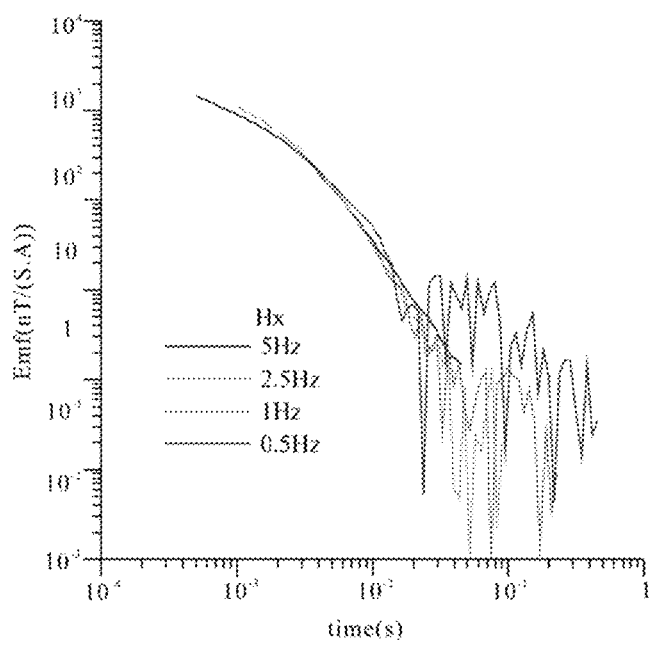
FIG. 6C is schematic diagrams of electromagnetic field response curves in the case of the fixed emitting and receiving distance and different emission fundamental frequencies.
Figure 6D:
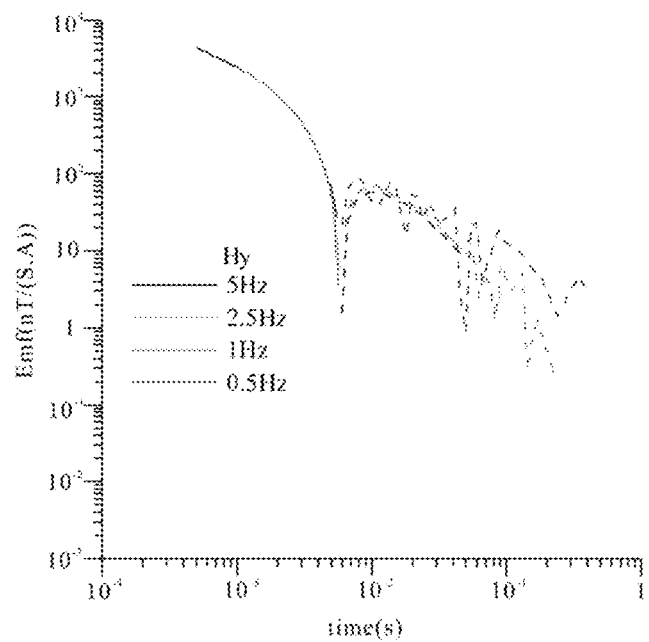
FIG. 6D is schematic diagrams of electromagnetic field response curves in the case of the fixed emitting and receiving distance and different emission fundamental frequencies.
Figure 6E:
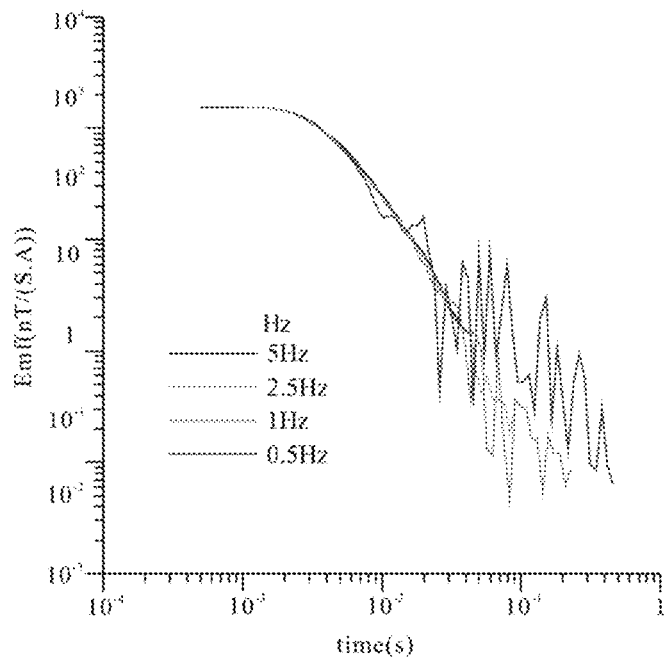
FIG. 6E is schematic diagrams of electromagnetic field response curves in the case of the fixed emitting and receiving distance and different emission fundamental frequencies.
Figure 7A:
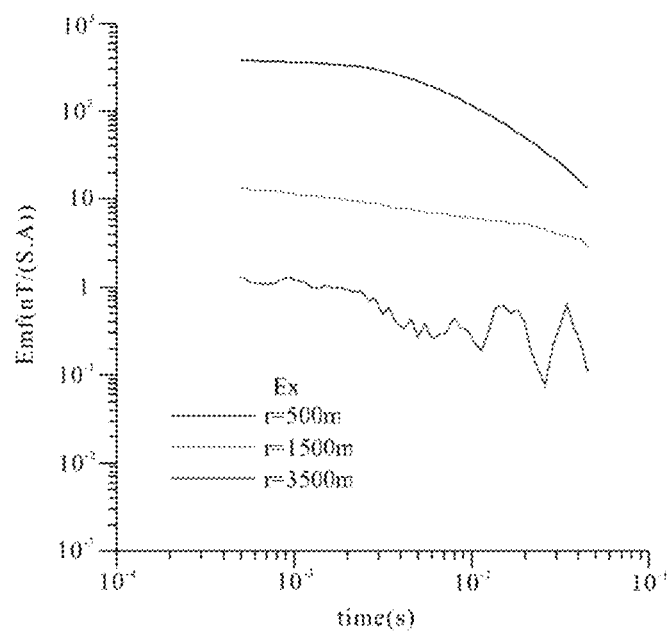
FIG. 7A is schematic diagrams of electromagnetic field response curves in the case of the fixed emission fundamental frequency and different offsets.
Figure 7B:
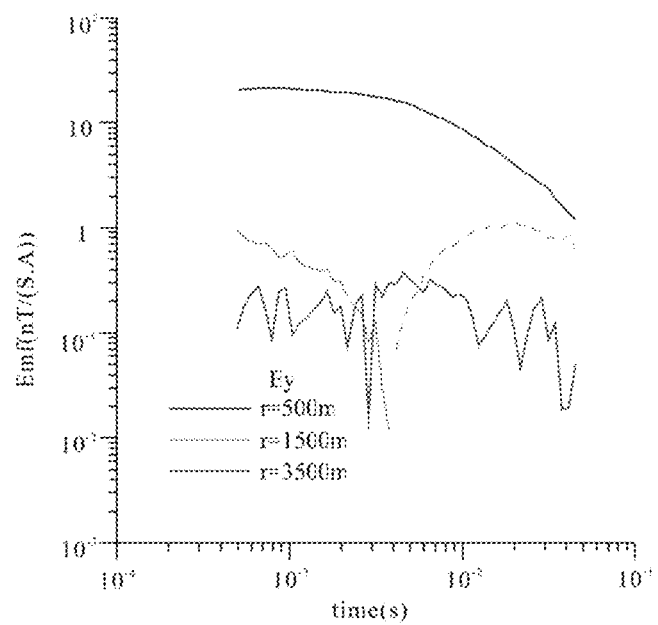
FIG. 7B is schematic diagrams of electromagnetic field response curves in the case of the fixed emission fundamental frequency and different offsets.
Figure 7C:
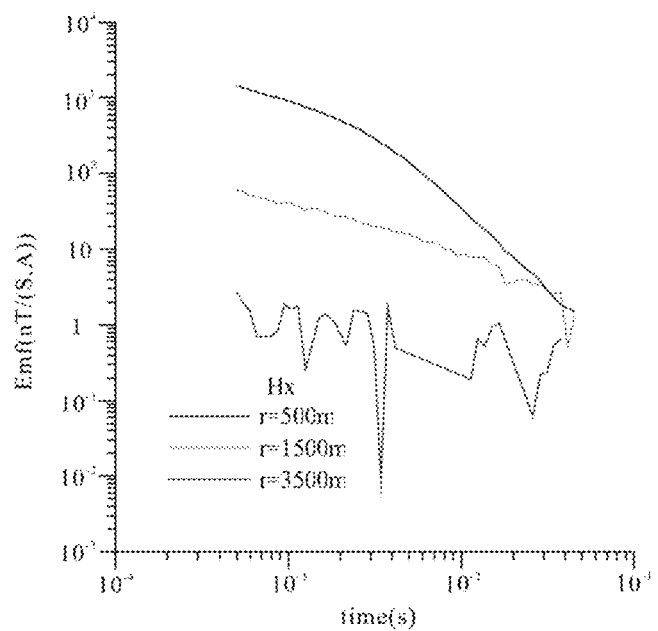
FIG. 7C is schematic diagrams of electromagnetic field response curves in the case of the fixed emission fundamental frequency and different offsets.
Figure 7D:
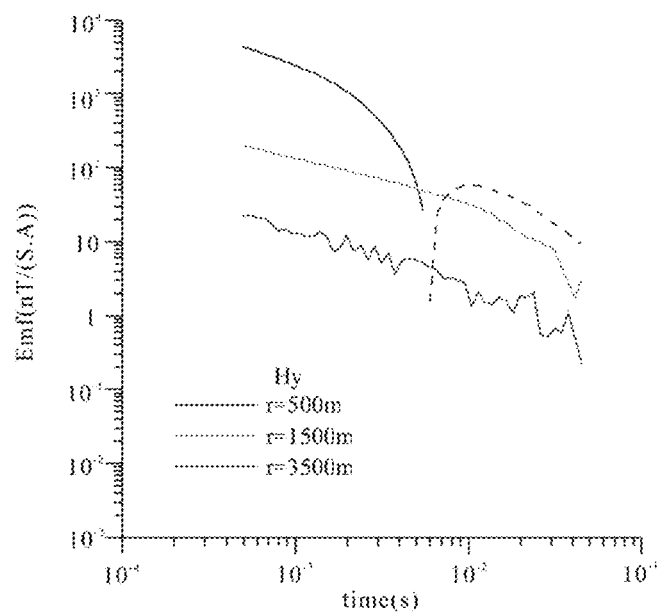
FIG. 7D is schematic diagrams of electromagnetic field response curves in the case of the fixed emission fundamental frequency and different offsets.
Figure 7E:
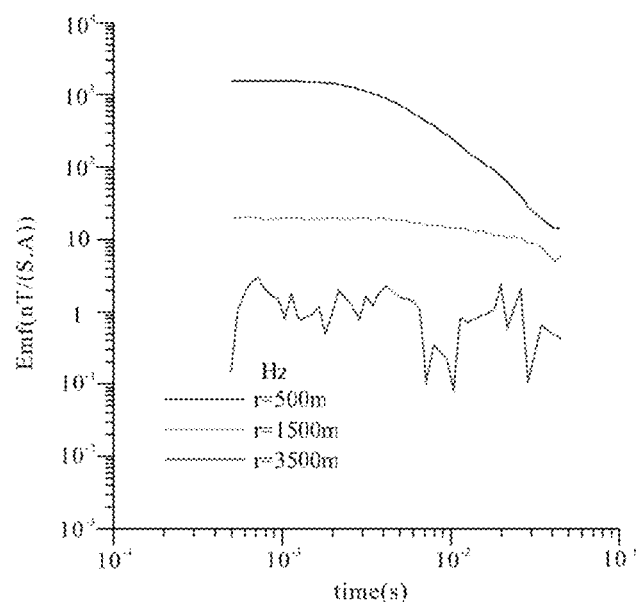
FIG. 7E is schematic diagrams of electromagnetic field response curves in the case of the fixed emission fundamental frequency and different offsets.

In the test, the position of the receiving point remains unchanged so as to ensure the consistency of the noise environment and the geological environment. The electromagnetic field responses under different offsets and different observation durations are studied by changing the position of the emission source and the fundamental frequency of the emission current. The geometrical arrangement of emission and reception in test is shown in FIG. 5. The parameters of three emission sources are fixed: the length of the emission source is 1 km and the emission current is 16 A. A non-polarized electrode is used for receiving the electric field at the receiving terminal, the electrode distance is fixed at 50 m, a 7K-SB model probe with an effective area of 40000 $m^2$ is used for receiving induction voltage, and the time period for each survey at a single point is 7 minutes.

2. Test Content and Results 2.1 Responses of Electromagnetic Components in the Case of the Fixed Emitting and Receiving Distance and Different Emission Fundamental Frequencies Firstly, in a case that the emitting and receiving distance is fixed at 500 m, the electromagnetic field responses at the fundamental frequencies of the emission current of 5 Hz, 2.5 Hz, 1 Hz and 0.5 Hz are observed. The ranges of observation period corresponding to the four frequencies are shown in table 2. FIG. 6A to FIG. 6E show observation results, where Ex represents an electric field component in the x direction, Ey represents an electric field component in the y direction, Hx represents a magnetic field component in the x direction, Hy represents a magnetic field component in the y direction, and Hz represents a magnetic field component in the z direction. It can be seen from the drawings that when the signal quality is high and the attenuation curve is smooth, the signals of different emission fundamental frequencies have better fitting degrees within a range where the observation periods coincide. It shows that except for the emission fundamental frequency, other factors do not have a significant effect on the signals. With the reduction of the emission fundamental frequency, the signal quality of the components of the electromagnetic field at a later phase becomes worse and worse. Overall, all the curves exhibit severe oscillation after 10 ms, which indicates that the signal at this point has been interfered by external noise. It should be noted that when the fundamental frequency is 5 Hz, the attenuation curve of the signal is relatively smooth in all the observation periods, while the curves of other emission fundamental frequencies are already oscillated in the period that coincides with a later phase of the signal. This is because the lower the emission fundamental frequency is, the lower the number of times that the signals are superimposed in the same observation period will be, resulting in a decrease in the smoothness of the signal attenuation curve at the same moment, the same signal intensity and in the same noise environment.

2.2 Responses of Electromagnetic Components in the Case of Fixed Emission Fundamental Frequency and Different Offsets Then, the emission fundamental frequency is fixed at 5 Hz, and the responses of the electromagnetic field components in the case that the offset distance is 500 m, 1500 m, and 3500 m respectively are observed. The observation results are shown in FIG. 7A to FIG. 7E. Apparently, with the increase of the offset, the signal intensity of each component is greatly decreased, and the smoothness of the signal curve becomes worse and worse, which is consistent with the conclusion obtained through theoretical analysis. Therefore, it can be seen that it is difficult to observe high-quality signals at large offsets, which is also why LOTEM needs to use non-stopped continuous waveform excitation to increase the observation signal intensity and ensure the accuracy of the extracted secondary field. In addition, due to insufficient observation duration, the responses at individual offsets do not have an intersection which exists in the theoretical analysis. Therefore, the advantage that the signal at a later phase is strong at a large offset no longer exists in this case. According to the theory of propagation and diffusion of electromagnetic waves, the high-frequency component of electromagnetic wave has a small wavelength and a fast attenuation speed, and therefore it is mainly concentrated on small offsets. The low-frequency component of electromagnetic wave has a large wavelength and a slow attenuation speed, and therefore it is mainly concentrated at large offsets. Therefore, as the offset is increased, the effect of the high-frequency electromagnetic field becomes weaker and weaker. As a result, the early signals that are dominated by the high-frequency electromagnetic field not only have reduced intensity, but also can be easily interfered by the geological noise and external noise.

2.3 Overall Apparent Resistivity and Inversion Results

Figure 8A:
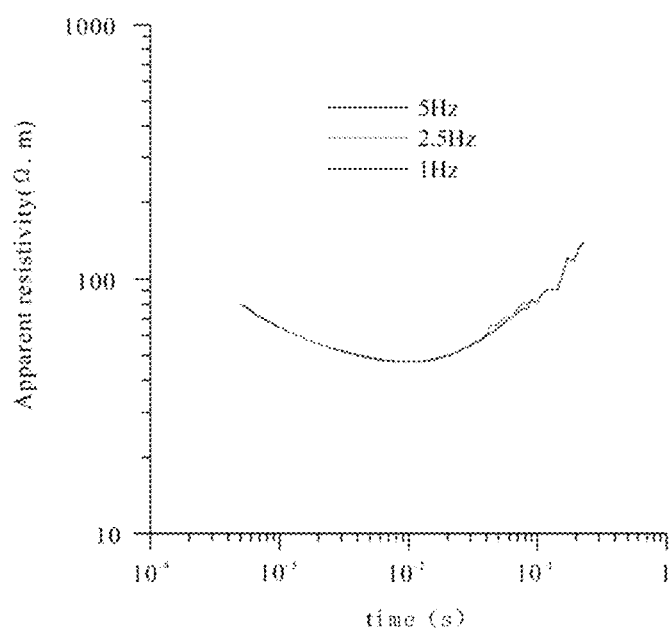
FIG. 8A schematic diagrams of an overall apparent resistivity and smoke ring inversion results, respectively.
Figure 8B:
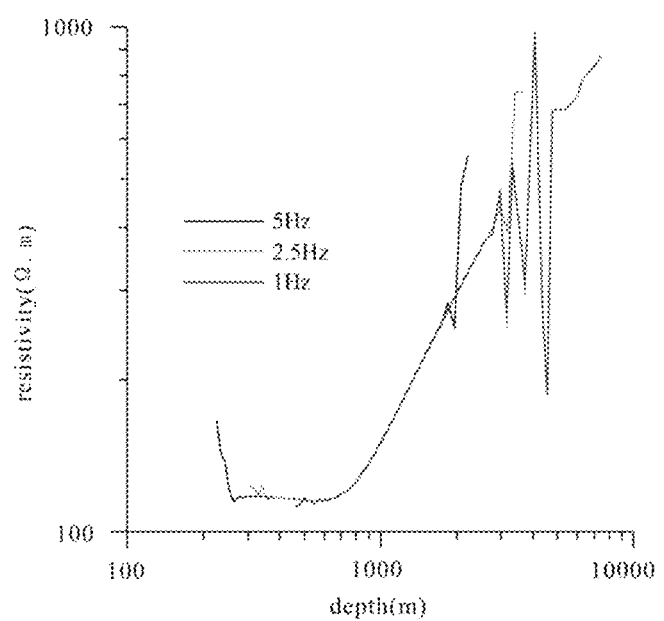
FIG. 8B schematic diagrams of an overall apparent resistivity and smoke ring inversion results, respectively.

The overall apparent resistivity calculation and one-dimensional smoke ring inversion are carried out with data when the offset is equal to 500 m and the emission fundamental frequency is 5 Hz, 2.5 Hz, and 1 Hz respectively, and the results are shown in FIG. 8A and FIG. 8B. During calculation, the induced voltage needs to be converted into a vertical magnetic field firstly. As can be seen from the apparent resistivity curve, the calculation result at each frequency shows that the stratum electrical property of the survey zone has an H-structure, and the calculation results for individual frequencies within the coincidence period range have good fitting degree. The apparent resistivity curve has a slight jitter only because the quality of data at a later phase is not high at 2.5 Hz and 1 Hz. The one-dimensional inversion results show different results. The inversion result at 5 Hz shows that the stratum electrical property has an H-structure, while the inversion results at 2.5 Hz and 1 Hz show that the stratum electrical property has a G-structure. It indicates that the signals of the earliest time channel corresponding to the two lower fundamental frequencies have penetrated the high-resistance layer of the earth surface, and the stratum above this depth becomes blind zone of observation. In addition, the inversion curve at 1 Hz corresponding to a late time channel (a large depth) becomes severely oscillated, and its utility value is lost. Generally speaking, both the overall apparent resistivity and one-dimensional smoke ring inversion can accurately reflect the real changes in the electrical property of the stratum under the survey site.

3. Test Conclusion

In this test, the actual observations are performed on the electromagnetic field responses at different offsets and different observation delays (emission fundamental frequencies), and a comparative analysis is performed based on theoretical results. Basically, the response variation characteristics of the electromagnetic field components observed actually match with the theoretical analysis results, and the correctness of the theoretical work is verified. However, due to a large number of factors involved in the actual survey, including instrumentation, geological structure, noise, and human factors, the signal quality is severely reduced in two cases of the large offset and the later period range, and it is almost impossible to use the signal. This test demonstrates the superiority of short offset work from the perspective of the practical work.

The vertical induced voltage values observed at the test site are selected. Firstly, the observed vertical induced voltage values are converted into a vertical magnetic field, then the overall apparent resistivity is calculated by using the fitting polynomial method introduced in section 5, and the one-dimensional smoke ring inversion is performed. The result basically correctly reflects the actual changes in the electrical property of the stratum under this site.

It can be appreciated by those skilled in the art that the methods of various examples described with reference to the embodiments disclosed herein can be implemented with electronic hardware, computer software, or a combination thereof. In order to clearly illustrate the interchangeability of electronic hardware and software, the components and steps of the examples have been generally described in terms of functionality in the above description. Whether these functions are implemented in electronic hardware or software depends on the specific application of the technical solution and design constraints. Those skilled in the art can use different methods to implement the described functions for each specific application, but such implementations should not be construed as going beyond the scope of the present disclosure.

Hitherto, the technical solutions of the present disclosure have been described with reference to the preferred embodiments shown in the accompanying drawings. However, it can be easily understood by those skilled in the art that the scope of protection of the present disclosure is obviously not limited to these specific embodiments. Those skilled in the art can make equivalent changes or replacements to the related technical features without departing from the principle of the present disclosure, and the technical solutions after these changes or replacements will fall within the scope of protection of the present disclosure.

What is claimed is:

1. A device for ground source transient electromagnetic near-field detection, the device comprising:
    an excitation source emitting device and a receiving device for signal detection, wherein the excitation source emitting device comprises an emission source, the emission source is a grounded conductor wire; the grounded conductor wire is used to convert a bipolar pulse current into an electromagnetic field to be emitted underground; and
    wherein the receiving device is configured for detecting a magnetic field and electric field signal in a survey line segment of an observation range of the grounded conductor wire by using the method of areal sideline scanning survey;
    wherein the observation range is selected by the following method:

in the case of a vertical magnetic field component, selecting an equatorial zone on both sides of the emission source, whose range of observation is limited to an area forming 150 degrees with both ends of the emission source, as an observation zone;

in the case of a horizontal electric field component, selecting the axial zone along the direction of the extension line of the emission source as an observation zone.

2. The device for ground source transient electromagnetic near-field detection according to claim 1, wherein a length of the grounded conductor wire satisfies the following conditions:

a actual length L of the grounded conductor wire satisfies a condition of:

$$L \geq L_{line} - 3.5 r_{min}$$

a minimum length $L_{min}$ of the grounded conductor wire satisfies a condition of:

$$L_{min} > 3L_a$$

wherein $L_{line}$ represents a length of the survey line segment covered by the emission source;

$r_{min}$ represents a minimum offset of the survey line segment; and $L_a$ represents a linear scale of a shallow electrical non-uniform body.

3. The device for ground source transient electromagnetic near-field detection according to claim 2, wherein offsets of the survey line segment satisfy the following conditions:

the minimum offset $r_{min}$ satisfies a condition of:

$$r_{min} \geq 3 \times 10^{-3} S_{max} \cdot H_{max}^4 \cdot \frac{\Delta V_{min}}{I \cdot L \cdot q}$$

a maximum offset $r_{max}$ satisfies a condition of:

$$r_{max} \leq 2 S_{max} \cdot \left[ \frac{L \cdot I \cdot q}{\Delta \overline{V}} \cdot \rho_\tau \right]^{1/4}$$

wherein $S_{max}$ represents a total longitudinal conductance value within the range of maximum detection depth on the observed profile;

$H_{max}$ represents a maximum detection depth;

$\Delta V_{min}$ represents a minimum effective value of an observed signal;

L represents the actual length of the emission source;

I represents an intensity of emission current;

q represents an effective receiving area for coils or magnetic rod;

$\Delta \overline{V}$ represents an average value of interference signals in a test zone; and $\rho_\tau$ represents an average value of apparent resistivity on an observed profile.

4. The device for ground source transient electromagnetic near-field detection according to claim 1, wherein the bipolar pulse current has a square wave width D of:

$$D = 2.5 T_{max}$$

$$T_{max} \geq 2\mu H_{max} \cdot S_{max}$$

wherein $T_{max}$ represents a maximum recording time required;

$S_{max}$ represents a total longitudinal conductance value within a range of maximum detection depth on the observed profile;

$H_{max}$ represents a maximum detection depth; and $\mu$ represents a magnetic permeability of medium.

5. The device for ground source transient electromagnetic near-field detection according to claim 1, wherein the method of areal sideline scanning survey is point-by-point survey or multi-point simultaneous survey.

6. A method for ground source transient electromagnetic near-field detection, the method comprising: performing signal detection using the device for ground source transient electromagnetic near-field detection according to claim 1 and calculating an overall apparent resistivity ρs using the following method:

$$\rho_s = (\mu_0 r^2 / 4t) \cdot g[h_z(t)]$$

$$g[h_z(t)] = \sum_{i=1}^{5} a_i y^{\beta_i}$$

wherein $\mu_0$ represents a magnetic permeability of vacuum medium;

r represents offsets between an emission source location and a receiving position;

t represents a sampling delay;

$a_i, \beta_i$ are valued according to a preset valuing rule table; and y represents a uniform half-space magnetic field with a normalized surface at a distance r from the horizontal electric couple emission source.

7. The method for ground source transient electromagnetic near-field detection according to claim 6, wherein the preset valuing rule table of $a_i, \beta_i$ is:

| | i | 1 | 2 | 3 | 4 | 5 |
|---|---|---|---|---|---|---|
| $y \leq 10^{-5}$ | α | 0.449037 | 0.0 | 0.0 | 0.0 | 0.0 |
| | β | −2/3 | — | — | — | — |
| $10^{-5} < y \leq 0.05$ | α | 0.447673 | 0.227530 | −2.56717 | 6.66952 | −4.62450 |
| | β | −2/3 | −2/5 | −2/7 | −2/9 | −2/11 |
| $0.05 < y \leq 0.2$ | α | 0.264751 | 8.17744 | −50.0017 | 89.4178 | −47.7681 |
| | β | −2/3 | −2/5 | −2/7 | −2/9 | −2/11 |
| $0.2 < y \leq 0.45$ | α | 0.430426 | −0.503995 | 0.469312 | −0.603661 | 0.259355 |
| | β | −2/3 | 1/3 | 4/3 | 7/3 | 10/3 |
| $0.45 < y \leq 1$ | α | 0.666667 | −0.014646 | −0.273327 | 1.03901 | 0.245262 |
| | β | −2/3 | 2 | 3 | 4 | 5. |

8. A non-transitory computer readable storage medium, wherein a plurality of programs are adapted to be loaded and executed by a processor so as to implement the method for ground source transient electromagnetic near-field detection according to claim 6.

* * * * *